(12) United States Patent
Wang et al.

(10) Patent No.: US 10,848,466 B2
(45) Date of Patent: Nov. 24, 2020

(54) METHOD, SERVER AND STORAGE MEDIUM FOR DATA DISTRIBUTION

(71) Applicant: PING AN TECHNOLOGY (SHENZHEN) CO., LTD., Shenzhen (CN)

(72) Inventors: Jianzong Wang, Shenzhen (CN); Zhangcheng Huang, Shenzhen (CN); Tianbo Wu, Shenzhen (CN); Jing Xiao, Shenzhen (CN)

(73) Assignee: PING AN TECHNOLOGY (SHENZHEN) CO., LTD., Shenzhen (CN)

( * ) Notice: Subject to any disclaimer, the term of this patent is extended or adjusted under 35 U.S.C. 154(b) by 84 days.

(21) Appl. No.: 16/463,740

(22) PCT Filed: Aug. 31, 2017

(86) PCT No.: PCT/CN2017/100019
§ 371 (c)(1),
(2) Date: May 23, 2019

(87) PCT Pub. No.: WO2018/233051
PCT Pub. Date: Dec. 27, 2018

(65) Prior Publication Data
US 2019/0386962 A1 Dec. 19, 2019

(30) Foreign Application Priority Data

Jun. 23, 2017 (CN) .......................... 2017 1 0488427

(51) Int. Cl.
*H04L 29/06* (2006.01)
*H04L 29/08* (2006.01)

(52) U.S. Cl.
CPC ........ *H04L 63/0421* (2013.01); *H04L 63/105* (2013.01); *H04L 63/20* (2013.01); *H04L 67/2823* (2013.01)

(58) Field of Classification Search
None
See application file for complete search history.

(56) References Cited

U.S. PATENT DOCUMENTS 7,667,575 B2 * 2/2010 Husak ................. G06K 7/0008
340/10.2
9,811,684 B1 * 11/2017 Sterling ................. G06F 21/31
(Continued)

FOREIGN PATENT DOCUMENTS

| CN | 103902924 A | 7/2014 |
| CN | 105095447 A | 11/2015 |

(Continued)

OTHER PUBLICATIONS

International Search Report for Application No. PCT/CN2017/100019 dated Mar. 22, 2018.

*Primary Examiner* — Maung T Lwin
(74) *Attorney, Agent, or Firm* — Rimon PC

(57) ABSTRACT

A method for data distribution includes: receiving a request for data distribution sent from a terminal; searching for raw association network data, wherein the raw association network data includes a set of nodes and a set of edges existing between the nodes; searching for a corresponding user grade according to a user identifier carried in the request for data distribution, and determining a privacy budget parameter corresponding to the user grade; determining the distributing probability distribution corresponding to the raw association network data to be distributed according to a pre-constructed Laplace Model and the determined privacy budget parameter; selecting an arbitrary value within the distributing probability distribution as a distributing probability for each (Continued)

network edge of the set of edges, generating a random number between 0 to 1 for each network edge, comparing the random number to the distributing probability, and distributing the corresponding network edge when the distributing probability is greater than the random number.

15 Claims, 5 Drawing Sheets

(56) References Cited

U.S. PATENT DOCUMENTS

| | | | |
|---|---|---|---|
| 2011/0208763 | A1 | 8/2011 | McSherry et al. |
| 2012/0143922 | A1* | 6/2012 | Rane ................... G06Q 10/00 707/803 |
| 2013/0145473 | A1* | 6/2013 | Cormode ......... G11B 20/00086 726/26 |
| 2013/0215961 | A1 | 8/2013 | Nakagawa et al. |
| 2017/0109544 | A1* | 4/2017 | Chen ................... G06F 21/6254 |
| 2018/0173894 | A1* | 6/2018 | Boehler ............. H04W 12/001 |

FOREIGN PATENT DOCUMENTS

| | | | |
|---|---|---|---|
| CN | 105376243 | A | 3/2016 |
| CN | 105608389 | A | 5/2016 |
| CN | 106685893 | A | 5/2017 |

* cited by examiner

METHOD, SERVER AND STORAGE MEDIUM FOR DATA DISTRIBUTION

This application claims priority to the international patent application PCT/CN2017/100019 filed on Aug. 31, 2017 which claims priority to Chinese patent application No. 201710488427.4 titled "METHOD, DEVICE, SERVER AND STORAGE MEDIUM FOR DATA DISTRIBUTION", and filed on Jun. 23, 2017, the disclosure of both applications being hereby incorporated herein in its entirety by reference.

BACKGROUND

With the rapid development of information technology and the arise of the era of big data, the demands on data collection, distribution and analysis are increasing over time, while the potential leakage of user privacy from these data has become a problem causing widespread concern.

The data to be distributed is generally added with noise and then distributed for a traditional privacy protection. However, if association network data containing a user association relationship is distributed in the traditional manner of adding fixed noise, it may leave a security hole for an attacker so that the attacker deduces the privacy information by mining the difference between the results of the distributed data, which results in poor reliability of the privacy protection.

SUMMARY

In view of various embodiments in the present disclosure, provided is a method, server and storage medium for data distribution which is capable of implementing a more reliable differential privacy protection for distributed association network data.

A method for data distribution includes:
receiving a request for data distribution sent from a terminal;
searching for raw association network data in response to the request for data distribution, wherein the raw association network data includes a set of nodes and a set of edges existing between the nodes;
searching for a corresponding user grade according to a user identifier carried in the request for data distribution, and determining a privacy budget parameter corresponding to the user grade, wherein the lower the user grade, the smaller the privacy budget parameter is;
determining a distributing probability distribution corresponding to the raw association network data to be distributed according to a pre-constructed Laplace Model and the determined privacy budget parameter, wherein the lower the privacy budget parameter, the smaller a value range of the distributing probability distribution is; and
selecting an arbitrary value within the distributing probability distribution as a distributing probability for each network edge of the set of edges, generating a random number between 0 to 1 for each network edge, comparing the random number to the distributing probability, and distributing the corresponding network edge when the distributing probability is greater than the random number.

A device for data distribution includes:
a data distribution request module, configured to receive a request for data distribution sent from a terminal;
a raw data acquisition module, configured to search for raw association network data in response to the request for data distribution, wherein the raw association network data includes a set of nodes and a set of edges existing between the nodes;
a parameter determining module, configured to search for a corresponding user grade according to a user identifier carried in the request for data distribution, and determine a privacy budget parameter corresponding to the user grade, wherein the lower the user grade, the smaller the privacy budget parameter is;
a distributing probability calculation module, configured to determine a distributing probability distribution corresponding to the raw association network data to be distributed according to a pre-constructed Laplace Model and the determined privacy budget parameter, wherein the lower the privacy budget parameter, the smaller a value range of the distributing probability distribution is; and
a distributing data determining module, configured to select an arbitrary value within the distributing probability distribution as a distributing probability for each network edge of the set of edges, generate a random number between 0 to 1 for each network edge, compare the random number to the distributing probability, and distribute the corresponding network edge when the distributing probability is greater than the random number.

A server includes a processor, and a memory storing computer-executable instructions operable to be executed by the processor to cause the processor to perform following steps:
receiving a request for data distribution sent from a terminal;
searching for raw association network data in response to the request for data distribution, wherein the raw association network data includes a set of nodes and a set of edges existing between the nodes;
searching for a corresponding user grade according to a user identifier carried in the request for data distribution, and determining a privacy budget parameter corresponding to the user grade, wherein the lower the user grade, the smaller the privacy budget parameter is;
determining a distributing probability distribution corresponding to the raw association network data to be distributed according to a pre-constructed Laplace Model and the determined privacy budget parameter, wherein the lower the privacy budget parameter, the smaller a value range of the distributing probability distribution is; and
selecting an arbitrary value within the distributing probability distribution as a distributing probability for each network edge of the set of edges of the raw association network data, generating a random number between 0 to 1 for each network edge, comparing the random number to the distributing probability, and distributing the corresponding network edge when the distributing probability is greater than the random number.

One or more non-volatile readable storage media stores computer-executable instructions operable to be executed by one or more processors to cause the one or more processors to perform following steps:
receiving a request for data distribution sent from a terminal;
searching for raw association network data in response to the request for data distribution, wherein the raw association network data includes a set of nodes and a set of edges existing between the nodes;
searching for a corresponding user grade according to a user identifier carried in the request for data distribution, and determining a privacy budget parameter corresponding to the user grade, wherein the lower the user grade, the smaller the privacy budget parameter is;

determining a distributing probability distribution corresponding to the raw association network data to be distributed according to a pre-constructed Laplace Model and the determined privacy budget parameter, wherein the lower the privacy budget parameter, the smaller a value range of the distributing probability distribution is; and selecting an arbitrary value within the distributing probability distribution as a distributing probability for each network edge of the set of edges of the raw association network data, generating a random number between 0 to 1 for each network edge, comparing the random number to the distributing probability, and distributing the corresponding network edge when the distributing probability is greater than the random number.

The details of one or more embodiments of the present disclosure are set forth in the accompanying drawings and the description below. Other features, objectives and advantages of the present disclosure will become apparent from the specification, accompanying drawings and claims.

BRIEF DESCRIPTION OF THE DRAWINGS

For the purpose of illustrating the technical solutions of the embodiments in the application or in the prior art more explicitly, the accompanying drawings to be used necessarily for the description of the embodiments or the prior art will be briefly described below. Apparently, the accompanying drawings described below are some embodiments of the application only, other drawings may further be acquired based on these accompanying drawings herein without creative efforts to those of ordinary skill in the art.

DETAILED DESCRIPTION OF THE EMBODIMENTS

To make the objectives, the technical solutions and the advantages of the present disclosure clearer, the present disclosure will be further described in detail with reference to the accompanying drawings and embodiments hereinafter. It is understood the detailed embodiments described herein are shown by way of illustration and not as a limitation to the disclosure.

Figure 1:
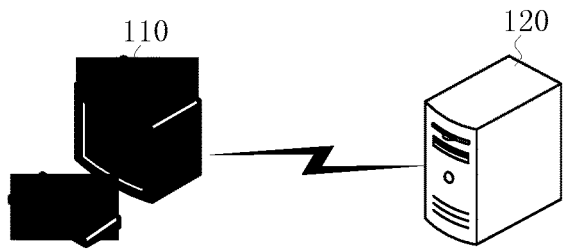
FIG. 1 is a schematic diagram illustrating an application environment of a method for data distribution according to one embodiment.

In one embodiment, as shown in FIG. 1, an application environment of a method for data distribution is illustrated, which includes a terminal 110 and a differential distribution server 120. The terminal 110 may communicate with the server 120 via a network. The terminal 110 may be, but not limited to, at least one of a smart phone, a tablet computer, a notebook computer, and a desktop computer. The differential distribution server 120 may be a separate physical server, and may be also a server cluster composed of multiple physical servers. The terminal 110 sends a request for data distribution to the server 120. The server searches for raw association network data to be distributed in response to the request from the terminal, and determines a user grade according to a user identifier, so as to determine a privacy budget parameter capable of representing varying measures of privacy protection. Based on this privacy budget parameter a distributing probability distribution is calculated. The determination of the distribution of each of network edges is based on the calculated distributing probability distribution and a random number generated for each network edge in the data, so as to achieve the purpose of privacy distribution in respect with the association network data. In comparison to the traditional differential privacy distribution that subjects the data to be distributed to the noise processing to varying extend, since the distributing probability and the random number of each network edge have randomness, it is thus difficult for attacker to obtain the difference between the distribution data, such that it fails to deduce the entire correct data, which achieves a more reliable differential privacy protection on the distributed association network data.

Figure 2:
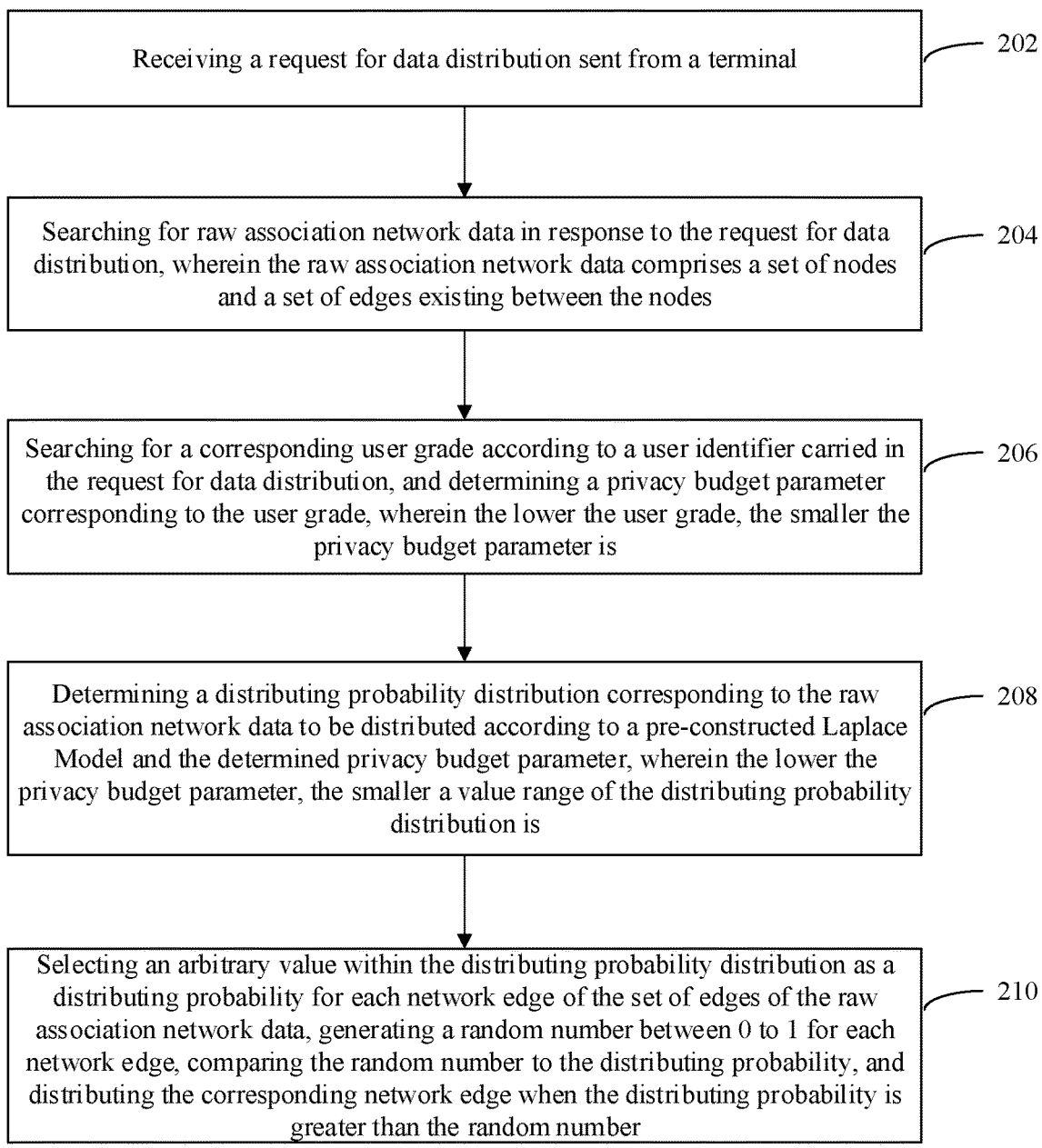
FIG. 2 is a flow diagram illustrating a method for data distribution according to one embodiment.

FIG. 2 is a flow diagram illustrating a method for data distribution according to one embodiment of the present disclosure. It should be understood that although all of the steps in the flow diagram of FIG. 2 are shown sequentially as the indication of the arrows, these steps do not have to be performed in the sequence as indicated by the arrows. Performing these steps does not have any sequential limitation such that these steps may be performed in another sequence unless it is illustrated explicitly in the context. Further, at least a part of steps may include multiple sub-steps or stages which may be performed in turn or alternately with the other steps or at least a part of the sub-steps or stages of the other steps, rather unnecessarily to be performed sequentially.

In reference to FIG. 2, the method for data distribution provided is illustrated by taking the application to the differential server shown in FIG. 1 as an example, specifically including the following steps.

At step S202, a request for data distribution sent from a terminal is received.

The terminal sends the request for data distribution, which carries a user identifier of the terminal and information of data requested to be distributed, to the differential distribution server. The information of data requested to be distributed may be a condition defined by the user that the data requested to be distributed needs to meet. For example, the data requested to be distributed may be friend information of a selected user u, status information of a student in a certain college or relationship data between a doctor and a patient. This data requested to be distributed is the data capable of establishing the association network.

This embodiment is directed to the method for data distribution of the association network data. The association network data means that there is an association relationship between the information contained in the data. The association relationship may be a friend relationship, a cooperation relationship, a doctor-patient relationship, a competition relationship or the like.

At step S204, raw association network data requested to be distributed is searched for, in response to the request for data distribution, wherein the raw association network data includes a set of nodes and a set of edges existing between the nodes.

The differential distribution server extracts the information of data requested to be distributed carried in the request for data distribution sent in response to the request for data distribution sent from the terminal, and acquires the corresponding raw association network data to be distributed according to the information of data requested to be distributed. The raw association network data refers to the raw true data without privacy calculation. The set of nodes and the set of edges existing between the nodes are acquired by abstracting the acquired raw association network data, wherein each network edge in the set of edges denote an association relationship between the nodes.

At step S206, a corresponding user grade is searched for, according to a user identifier carried in the request for data distribution, and a privacy budget parameter corresponding to the user grade is determined, wherein the lower the user grade, the smaller the privacy budget parameter is.

The correspondence between the user identifier and the user grade is pre-stored in the differential distribution server which provides different grades of users with respective privacy budget parameters (denoted by E). The privacy budget parameter E can reflect the privacy protection level, to provide different grades of users with data in different degrees of privacy protection, achieving the differential distribution of the data.

In one embodiment, the user may be graded according to the demand or the authority of the user (organization). By way of an example that a Disease Research Center requests for medical data, since the Disease Research Center is used to research disease causes, and relatively detailed medical data is required, a higher user grade is assigned to the Disease Research Center. A lower user grade is assigned to an unknown organization. It is readily understood that a higher user grade is assigned to a requesting user with a higher authority. For example, a high user grade is assigned to an administrator. A lower user grade is assigned to a user with a lower authority.

At step S208, the distributing probability distribution corresponding to the raw association network data to be distributed is calculated according to a pre-constructed Laplace Model and the determined privacy budget parameter, wherein the lower the privacy budget parameter, the smaller the value range of the distributing probability distribution is.

The differential distribution server constructs the Laplace Model for calculating the distributing probability in advance, in which the privacy budget parameter is a scale parameter of the model. A distribution curve of the distributing probability may be determined according to the determined privacy budget parameter, wherein the lower the privacy budget parameter is, the smaller the value range of the distributing probability distribution is.

At S210, an arbitrary value within the distributing probability distribution is selected as a distributing probability for each network edge of the set of edges, a random number between 0 to 1 is generated for each network edge, the random number is compared to the distributing probability, and the corresponding network edge is distributed when the distributing probability is greater than the random number.

The calculated distributing probability distribution is an interval value of a certain range. In this embodiment, a distributing probability value may be determined as the distributing probability for each network edge in the set of edges given one independent variable arbitrarily. If the interval of the value range of the distributing probability distribution is (0.4-0.6), 0.5 may be selected as the distributing probability for each network edge in the set of edges.

A random number is generated randomly for each network edge in the association network data, which is a decimal number between 0 and 1. The generated random number is compared to the determined distributing probability for the network edge. This network edge may not be distributed if the random number is greater than the distributing probability for the network edge. The network edge may be distributed if the random number is less than the distributing probability for the network edge. The network edge may either be or not be distributed if the random number is equal to the distributing probability.

In one embodiment, the random number for each network edge is generated according to the 0 to 1 distribution function.

The attacker cannot obtain the relationships among the distribution data due to the presence of the randomness. Even when a same user requests for same association network data, the distribution data obtained at different times are different, which guarantees the reliability of the privacy protection on the distribution data. Since the privacy budget parameter is the scale parameter of the distributing probability distribution, the higher the user grade, the greater the privacy budget parameter is. And the greater the value range of the distributing probability distribution is, the greater the probability that the distributing probability is greater than the random number is, and the greater the probability that each network edge is distributed is. That is, the user with a higher grade may acquire data with a less privacy degree, achieving the differential distribution of the data for different grades of users based on the effective protection on the distribution data.

In one embodiment, the pre-constructed Laplace Model is $$A(D) = M + lap^{\Delta f/\varepsilon}(x) \quad (1),$$

where D is the set of edges to be distributed, A(D) is the distributing probability distribution, $\Delta f/\varepsilon$ is the scale parameter of the probability distribution, $\varepsilon$ is the privacy budget parameter, M is the raw distributing probability of the data pre-configured by the server, and $lap^{\Delta f/\varepsilon}(x)$ is the Laplace random probability. The calculated distributing probability random probability. The calculated distributing probability may be caused to be a distribution function having randomness by adding the Laplace random probability $lap^{\Delta f/\varepsilon}(x)$.

In one embodiment, each of the distributed network edges is true network edge data in accordance with the distribution manner described above. The attacker may acquire the information of all the network edges, i.e. the raw association network data, by requesting for data for a significant number of times. To this end, a virtual network edge is added into the raw association network data, that is, the network edges in the raw association network data include truly existent edges between the nodes, and also include the virtual network edge added between the user nodes, i.e., the virtual network edge added between the nodes that do not have any association relationship therebetween. The pre-constructed Laplace Model is $$A(D) = \begin{cases} M + lap^{\Delta f/\varepsilon}(x) & \text{when the network edge is the true network edge} \\ lap^{\Delta f/\varepsilon}(x) & \text{when the network edge is the virtual network edge} \end{cases} \quad (2)$$

Figure 3:
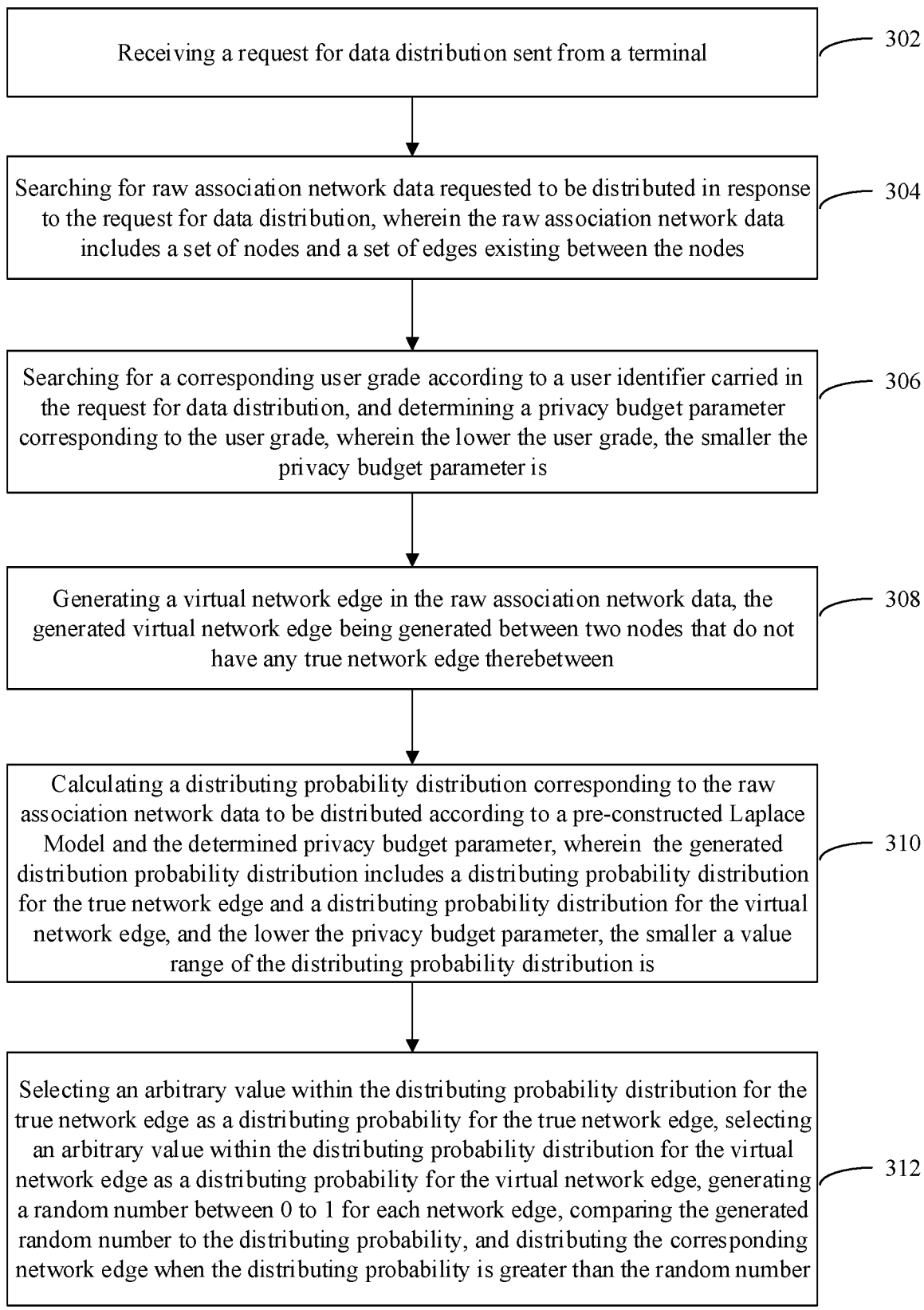
FIG. 3 is a flow diagram of the method for data distribution according to another embodiment.

As shown in FIG. 3, the method for data distribution related to the pre-constructed Laplace Model (2) includes the following steps.

At step S302, a request for data distribution sent from a terminal is received.

At step S304, raw association network data requested to be distributed is searched for, in response to the request for data distribution, wherein the raw association network data includes a set of nodes and a set of edges existing between the nodes.

It should be noted that the network edge in the set of edges contained in the raw association network data is the truly existent network edge.

At step S306, a corresponding user grade is searched for, according to a user identifier carried in the request for data distribution, and a privacy budget parameter corresponding to the user grade is determined, wherein the lower the user grade, the smaller the privacy budget parameter is.

At step S308, a virtual network edge in the raw association network data is generated, the generated virtual network edge being generated between two nodes that do not have any true network edge therebetween.

Figure 4:
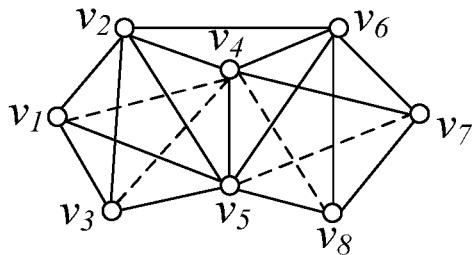
FIG. 4 is a schematic diagram illustrating a social network of association network data according to one embodiment.

The virtual network edge may be generated between any two nodes that do not have any true network edge. It is possible to generate a part of the virtual network edges only, or it is also possible to generate all the virtual network edges. As shown in FIG. 4, dash lines denote the generated virtual network edges. As shown, it is possible to generate virtual network edges between the node v3 and the node v8, between the node v2 and the node v8, between the node v2 and the node v7, and so on.

At step S310, the distributing probability distribution corresponding to the raw association network data to be distributed is calculated according to a pre-constructed Laplace Model and the determined privacy budget parameter, wherein the generated distributing probability distribution includes a distributing probability distribution for the true network edge and a distributing probability distribution for the virtual network edge, and the lower the privacy budget parameter, the smaller the value range of the distributing probability distribution is.

The pre-constructed Laplace Model is shown as the formula (2).

At step S312: an arbitrary value within the distributing probability distribution for the true network edge is selected as a distributing probability for the true network edge, an arbitrary value within the distributing probability distribution for the virtual network edge is selected as a distributing probability for the virtual network edge, a random number between 0 to 1 for each network edge is generated, the generated random number is compared to the distributing probability, and the corresponding network edge is distributed when the distributing probability is greater than the random number.

By means of adding the virtual network edge, the added non-existent network edge can also be distributed, which prevents the attacker from acquiring the information of all the network edges by requesting data for a significant number of times. The distribution of the virtual network edge information is equivalent to adding random noise into the distributed association network data, which further guarantees the reliability of the privacy protection on the distribution data.

In another embodiment, the distributing probability for each true network edge determined according to the calculated distributing probability distribution for the true network edge may also be different. For example, if the interval of the value range of the distributing probability distribution for the true network edge is (0.4-0.6), the distributing probability for a true network edge 1 may be selected to be 0.45, and the distributing probability for a true network edge 2 may be selected to be 0.55. Accordingly, the distribution probabilities for different virtual network edges may also be different. For example, if the value range of the distributing probability distribution for the virtual network edge is (0.1-0.3), the distributing probability for a virtual network edge 1 may be set to be 0.2, and the distributing probability for a virtual network edge 2 may be set to be 0.25. Further, whether or not to distribute the network edge may be determined according to its respective distributing probability.

Figure 5:
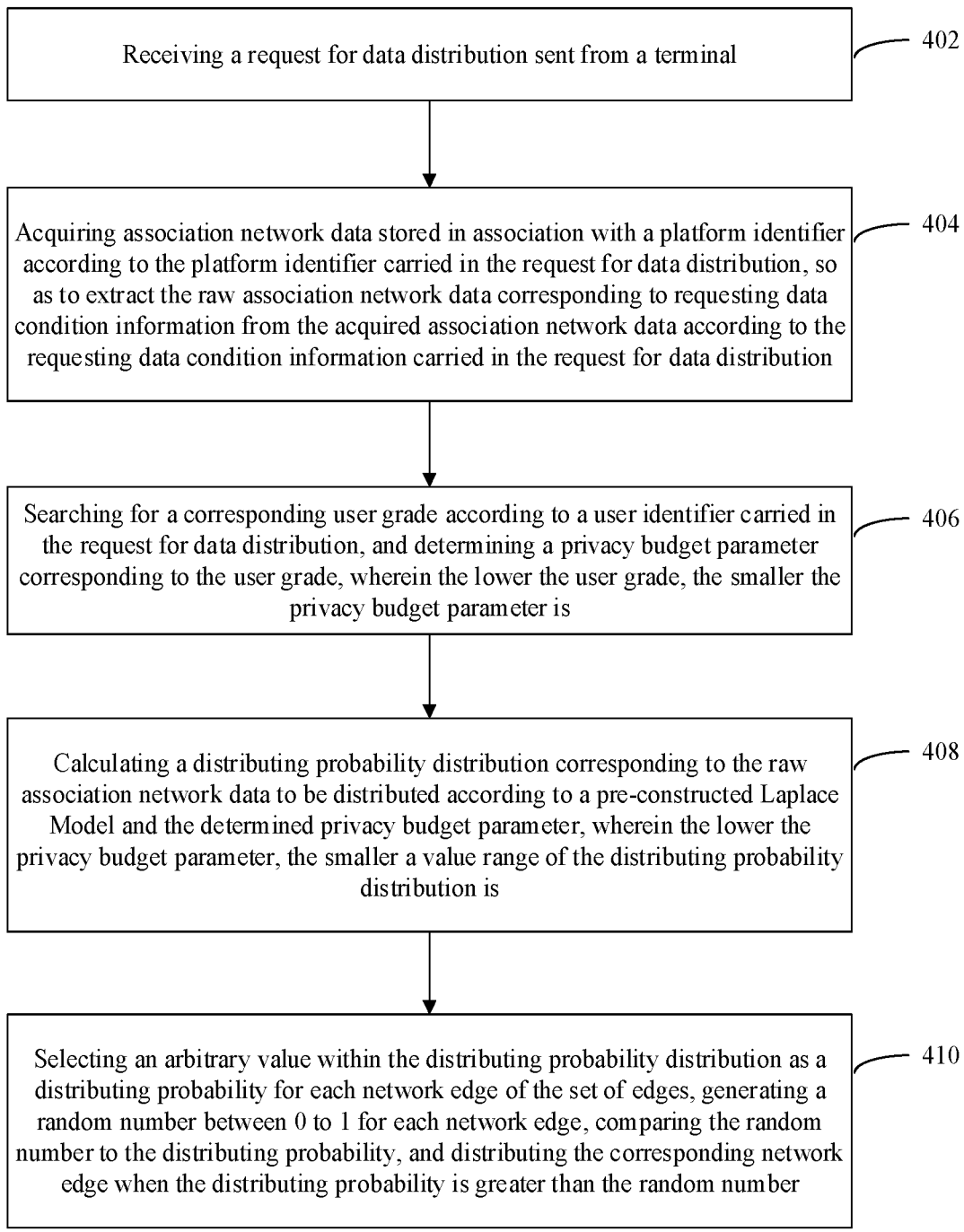
FIG. 5 is a flow diagram illustrating a method for data distribution according to a further embodiment.

In one embodiment, as shown in FIG. 5, the association network data from multiple social network platforms is pre-stored in the server and stored in association with a platform identifier. The method for data distribution includes the following steps.

At step S402, a request for data distribution sent from a terminal is received.

At step S404, association network data stored in association with a platform identifier is acquired according to the platform identifier carried in the request for data distribution, so as to extract a raw association network data corresponding to requesting data condition information from the acquired association network data according to the requesting data condition information carried in the request for data distribution.

Specifically, the platform identifier pre-stored in the server may be a medical platform identifier, a college platform identifier, an enterprise platform identifier etc., wherein each platform identifier described above may also include several sub platform identifiers, such as hospital A, and hospital B; and college A, and college B.

The differential distribution server searches for the association network data corresponding to the platform identifier according to the platform identifier carried, and acquires the association network data corresponding to the requesting data condition information carried in the request from platform big data, according to the requesting data condition information carried in the request.

In one embodiment, the differential distribution server may also send an instruction of requesting for data to a corresponding platform system via an interface with the platform system. The corresponding platform system returns the raw association network data corresponding to the data requesting condition. The differential distribution server performs differential privacy protection on the data, and then distributes the data to the requesting terminal.

At step S406, a corresponding user grade is searched for, according to a user identifier carried in the request for data distribution, and a privacy budget parameter corresponding to the user grade is determined, wherein the lower the user grade, the smaller the privacy budget parameter is.

At step S408: the distributing probability distribution corresponding to the raw association network data to be distributed is calculated according to a pre-constructed Laplace Model and the determined privacy budget parameter, wherein the lower the privacy budget parameter, the smaller the value range of the distributing probability distribution is. The pre-constructed Laplace Model is shown as below:

$$A(D)=M+lap^{\Delta f/\varepsilon}(x),$$

where D is the set of edges to be distributed, A(D) is the distributing probability distribution, $\Delta f/\varepsilon$ is a scale parameter of the probability distribution, $\varepsilon$ is the privacy budget parameter, and the server pre-stores the correspondence between a value M and the platform identifier. The value of M is determined based on the platform identifier corresponding to the raw association network data to be distributed and used to adjust the whole value range of the calculated distributing probability distribution.

That is, different platform identifiers correspond to different values of M. The values of M corresponding to the different platforms may be configured by the platform system. The value of M may be configured by the platform system for the user to make whole adjustment to the distributing probability of the data in the platform. If the value of M is set to be 0.5 by a certain hospital platform, the distributing probability of the data within this platform is at least 0.5. If the value of M is set to be 0.2 by a certain college platform, this platform sets a smaller value of M for the distribution of its internal data to cause its data distributing probability to be smaller so as to achieve a larger privacy protection on the data.

At step S410, an arbitrary value within the distributing probability distribution is selected as a distributing probability for each network edge of the set of edges, a random number between 0 to 1 for each network edge is generated, the generated random number is compared to the distributing probability, and the corresponding network edge is distributed when the distributing probability is greater than the random number.

In this embodiment, by establishing the correspondences between the values of M for adjusting probability in the distributing probability model and the different platform identifiers, the platform may control the distributing probability of its data by setting the value M, so as to macroscopically control the privacy protection on the data.

In one embodiment, it is undesirable for the user requesting for data to the differential distribution server that his/her own behavior of requesting for using distribution data is leaked. Therefore, in this embodiment, a protection on the identity of the user terminal requesting for data distribution is performed. In view of this, the method for data distribution is as below.

A user end sends a request for data distribution carrying a true user identifier to a trusted terminal. The trusted terminal searches for a pseudonym identifier corresponding to the true user identifier, and determines a user grade corresponding to the requesting user according to the pseudonym identifier, wherein the pseudonym identifier is a character string resulting from a calculation on the true user identifier of the user with an encryption algorithm by the trusted terminal. The trusted terminal sends the request for data distribution to the differential distribution server, and the request for data distribution carries the found pseudonym identifier and the user grade. The differential distribution server searches for the privacy budget parameter corresponding to the user grade, and searches for the raw association network data to be distributed, so as to calculate the distributing probability distribution of the raw association network data to be distributed according to the pre-constructed Laplace Model and the determined privacy budget parameter. The differential server selects an arbitrary value within the distributing probability distribution as the distributing probability for each network edge in the set of edges, and generates a random number between 0 to 1 for each network edge. The generated random number is compared to the distributing probability. If the distributing probability is greater than the random number, the corresponding network edge is distributed, and otherwise the corresponding network edge is not distributed. In this way, distribution data under privacy protection is generated. The differential distribution server pushes the generated distribution data under privacy protection to the trusted terminal which in turn pushes the distribution data under privacy protection to the user end.

Specifically, a user end that is actually querying data registers at the trusted terminal first. The trusted terminal generates a user identifier for the user end according to the registration information provided by the user end. User's identity number or mobile communication number may be used as the user identifier for the user end, which can reflect the user's true identity to a certain extent. To hide the user's true identity, the trusted terminal subjects the true user identifier to the encryption operation according to a set encryption algorithm to obtain the pseudonym identifier. The pseudonym identifier can not reflect the user's true identity.

The trusted terminal also assigns a user grade to the user according to the identity information provided by the user end at the time of the registration and the user property information, and establishes the association relationship between the user grade and the pseudonym identifier. The user's identity information may include the organization, the employer etc., which the user pertains to. The user property information includes the information of the user's authority etc.

When the user end sends a request for data distribution to the trusted terminal, the trusted terminal searches for the pseudonym identifier corresponding to the true user identifier first, and determines the user grade of the requesting user according to the association relationship between the pre-established user grade and the pseudonym identifier.

It should be noted that the trusted terminal herein may be a smart phone, a tablet computer, a notebook computer, a desktop computer, and it may also be a server or a server cluster.

This embodiment considers the demands on the privacy protection on the data users, and introduces a trusted proxy to implement the identity privacy protection on the data users.

Figure 6:
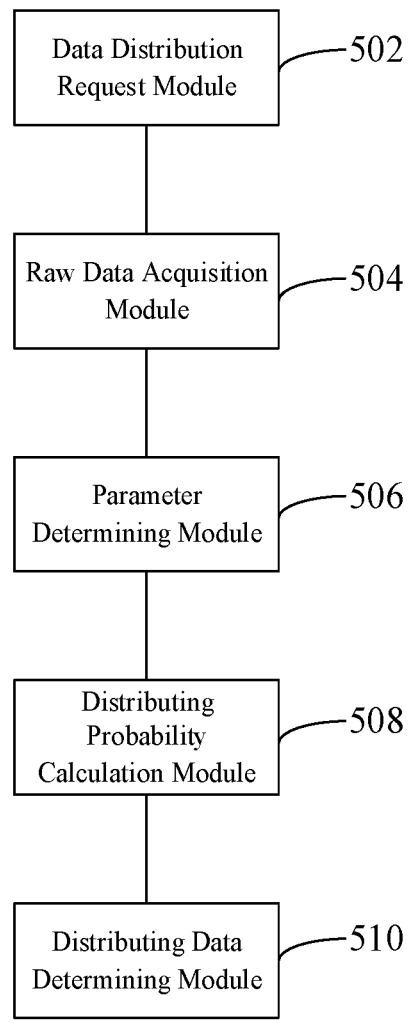
FIG. 6 is a structural block diagram illustrating a device for data distribution according to one embodiment.

In one embodiment, as shown in FIG. 6, provided is a device for data distribution, which includes:

a data distribution request module 502, configured to receive a request for data distribution sent from a terminal;

a raw data acquisition module 504, configured to search for raw association network data in response to the request for data distribution, wherein the raw association network data includes a set of nodes and a set of edges existing between the nodes;

a parameter determining module 506, configured to search for a corresponding user grade according to a user identifier carried in the request for data distribution, and determine a privacy budget parameter corresponding to the user grade, wherein the lower the user grade, the smaller the privacy budget parameter is;

a distributing probability calculation module 508, configured to calculate the distributing probability distribution corresponding to the raw association network data to be distributed according to a pre-constructed Laplace Model and the determined privacy budget parameter, wherein the lower the privacy budget parameter, the smaller the value range of the distributing probability distribution is; and a distributing data determining module 510, configured to select an arbitrary value within the distributing probability distribution as a distributing probability for each network edge of the set of edges, generate a random number between 0 to 1 for each network edge, compare the random number to the distributing probability, and distribute the corresponding network edge when the distributing probability is greater than the random number.

In one embodiment, the user identifier carried in the request for data distribution is a pseudonym identifier resulting from an encryption processing on a true user identifier. The request for data distribution further carries a user grade corresponding to the pseudonym identifier, and the user grade corresponding to the pseudonym identifier is found by a trusted terminal according to a correspondence between a pre-stored pseudonym identifier and the user grade. The parameter determining module 506 is also configured to extract the user grade of a requesting user carried in the request for data distribution, and determine the privacy budget parameter corresponding to the user grade according to a pre-configured correspondence between the user grade and the privacy budget parameter, wherein the lower the user grade, the smaller the privacy budget parameter is.

In one embodiment, the association network data from multiple social network platforms is pre-stored in the server and stored in association with a platform identifier.

The raw data acquisition module 504 is also configured to acquire the association network data stored in association with the platform identifier according to the platform identifier carried in the request for data distribution, so as to extract the raw association network data corresponding to the requesting data condition information from the acquired association network data according to the requesting data condition information carried in the request for data distribution, wherein the raw association network data includes the set of nodes and the set of edges existing between the nodes.

In one embodiment, the pre-constructed Laplace Model is $$A(D)=M+lap^{\Delta f/\varepsilon}(x),$$

where D is the set of edges to be distributed, A(D) is the distributing probability distribution, $\Delta f/\varepsilon$ is the scale parameter of the probability distribution, $\varepsilon$ is the privacy budget parameter, and the server pre-stores a correspondence between a value of M and the platform identifier. The value of M, being is determined by the server based on the platform identifier corresponding to the raw association network data to be distributed, and used to adjust a whole value range of the calculated distributing probability distribution.

In one embodiment, the distributing data determining module 510 is also configured to select an arbitrary value within the distributing probability distribution as the distributing probability for each network edge in the set of edges, generate a random number for each network edge according to the uniform distribution of 0 to 1, compare the random number to the distributing probability, and distribute the corresponding network edge when the distributing probability is not less than the random number, otherwise the corresponding network edge being not distributed.

Figure 7:
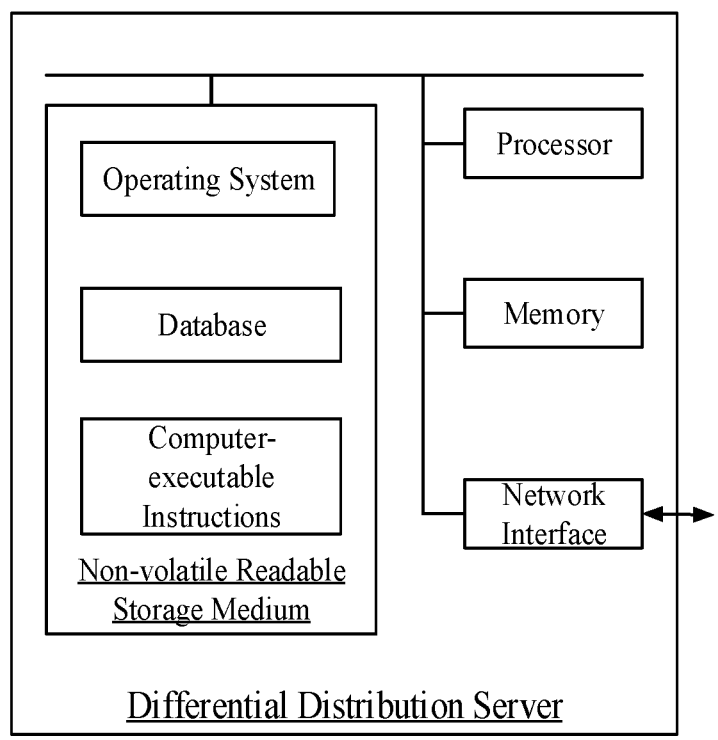
FIG. 7 is a schematic diagram illustrating an internal configuration of a server according to one embodiment.

In one embodiment, the device for data distribution described above in each of the embodiments may be implemented in the form of computer program, and computer-executable instructions corresponding to the computer program may be executed on the differential distribution server as shown in FIG. 7. Such differential distribution server includes a processor, a non-volatile storage medium, a memory and a network interface connected via a system bus. An Operating System, a database and the above computer-executable instructions implemented by the device for data distribution are stored in the non-volatile storage medium of such differential distribution server. The database is used to store data, such as the association network data to be distributed. The processor is used to provide abilities of calculation and control, and dominates the operation of the entire differential distribution server. The memory provides the environment for the operation of the Operating System in the non-volatile storage medium and the computer-executable instructions for implementation of the data distribution. The network interface is used to be communicatively connected to the terminal. Those skilled in the art should understand that the configuration of the differential distribution server shown in FIG. 7 is a block diagram of a partial configuration related to the solutions of the disclosure only, and does not constitute a limitation to the differential distributing server to which the solution of the disclosure is applied, the specific differential distribution server may include more or less parts than those shown in the diagram, or combine certain parts, or have a different arrangement of the parts.

The network interface described above may be an Ethernet card or a wireless network card, etc. Each module described above may embedded in or separated from the differential distribution server in the form of hardware, and may also be stored in the memory of the differential distribution server in the form of software as described above to facilitate the call from the processor to perform the operations that each modules above correspond to. Such processor may be a central processing unit (CPU), a microprocessor, a microcontroller, etc.

In one embodiment, provided are one or more non-volatile storage media storing the computer-executable instructions, when the instructions are executed by one or more processors, all or a part of the processes of the method in the embodiments described above are performed by one or more processors. The computer-executable instructions described above are the computer-executable instructions that computer programs, which are implemented by all or a part of the processes of the various embodiments described above, correspond to.

Those skilled in the art may appreciate that the implementation of all or a part of the processes in the method of the embodiments described above may accomplished by hardware instructed by computer programs, which may be stored in one computer-readable storage medium. For example, in the embodiments of the disclosure, the program may be stored in the storage medium of the computer system, and be executed by at least one processor of the computer system to implement the processes in the embodiments of the method described above, wherein the storage medium may be a magnetic disk, an optical disk, a Read-Only Memory (ROM), or the like.

Technical features of the above embodiments may be combined arbitrarily. For brief description, not all of the possible combinations of the technical features of the above embodiments are described, but it will be appreciated that these possible combinations belong to the scope of the present disclosure once there is no conflict between the technical features.

The above embodiments are merely illustrative of several embodiments of the disclosure, and the description thereof is more specific and detailed, but should not be deemed as limitations to the scope of the present disclosure. It should be noted that variations and improvements will become apparent to those skilled in the art to which the present disclosure pertains without departing from its scope. Therefore, the scope of the present disclosure is defined by the appended claims.

What is claimed is:

1. A method for data distribution, comprising:
receiving a request for data distribution sent from a terminal;
searching for raw association network data in response to the request for data distribution, wherein the raw association network data comprises a set of nodes and a set of edges existing between the nodes;
searching for a corresponding user grade according to a user identifier carried in the request for data distribution, and determining a privacy budget parameter corresponding to the user grade, wherein the lower the user grade, the smaller the privacy budget parameter is;
determining a distributing probability distribution corresponding to the raw association network data to be distributed according to a pre-constructed Laplace Model and the determined privacy budget parameter, wherein the lower the privacy budget parameter, the smaller a value range of the distributing probability distribution is; and
selecting an arbitrary value within the distributing probability distribution as a distributing probability for each network edge of the set of edges of the raw association network data, generating a random number between 0 to 1 for each network edge, comparing the random number to the distributing probability, and distributing the corresponding network edge when the distributing probability is greater than the random number.

2. The method of claim 1, wherein the user identifier carried in the request for data distribution is a pseudonym identifier resulting from an encryption processing on a true user identifier, the request for data distribution further carries a user grade corresponding to the pseudonym identifier, and the user grade corresponding to the pseudonym identifier is found by a trusted terminal according to a correspondence between a pre-stored pseudonym identifier and the user grade; and
wherein searching for the corresponding user grade according to the user identifier carried in the request for data distribution, and determining the privacy budget parameter corresponding to the user grade comprises:
extracting the user grade of a requesting user carried in the request for data distribution, and determining the privacy budget parameter corresponding to the user grade according to a pre-configured correspondence between the user grade and the privacy budget parameter.

3. The method of claim 1, wherein association network data from multiple social network platforms is pre-stored in the server and stored in association with a platform identifier; and
wherein searching for the raw association network data in response to the request for data distribution comprises:
acquiring the association network data stored in association with the platform identifier according to the platform identifier carried in the request for data distribution, so as to extract the raw association network data corresponding to requesting data condition information from the acquired association network data according to the requesting data condition information carried in the request for data distribution.

4. The method of claim 3, wherein the pre-constructed Laplace Model is $$A(D)=M+lap^{\Delta f/\varepsilon}(x)$$

where D is the set of edges to be distributed, A(D) is the distributing probability distribution, $\Delta f/\varepsilon$ is a scale parameter of the probability distribution, $\varepsilon$ is the privacy budget parameter, and wherein the server pre-stores a correspondence between a value of M and the platform identifier, and the value of M is determined by the server based on the platform identifier corresponding to the raw association network data to be distributed, and used to adjust a whole value range of the distributing probability distribution.

5. The method of claim 1, wherein selecting the arbitrary value within the distributing probability distribution as the distributing probability for each network edge of the set of edges, generating the random number between 0 to 1 for each network edge, comparing the random number to the distributing probability, and distributing the corresponding network edge when the distributing probability is greater than the random number comprises:
selecting the arbitrary value within the distributing probability distribution as the distributing probability for each network edge; and
generating the random number for each network edge according to a uniform distribution between 0 to 1, comparing the random number to the distributing probability, and distributing the corresponding network edge when the distributing probability is greater than the random number, otherwise the corresponding network edge being not distributed.

6. A server, comprising a processor, and a memory storing computer-executable instructions operable to be executed by the processor to cause the processor to perform following steps:
receiving a request for data distribution sent from a terminal;
searching for raw association network data in response to the request for data distribution, wherein the raw association network data comprises a set of nodes and a set of edges existing between the nodes;
searching for a corresponding user grade according to a user identifier carried in the request for data distribution, and determining a privacy budget parameter corresponding to the user grade, wherein the lower the user grade, the smaller the privacy budget parameter is;
determining a distributing probability distribution corresponding to the raw association network data to be distributed according to a pre-constructed Laplace Model and the determined privacy budget parameter, wherein the lower the privacy budget parameter, the smaller a value range of the distributing probability distribution is; and
selecting an arbitrary value within the distributing probability distribution as a distributing probability for each network edge of the set of edges of the raw association network data, generating a random number between 0 to 1 for each network edge, comparing the random number to the distributing probability, and distributing the corresponding network edge when the distributing probability is greater than the random number.

7. The server of claim 6, wherein the user identifier carried in the request for data distribution is a pseudonym identifier resulting from an encryption processing on a true user identifier, the request for data distribution further carries a user grade corresponding to the pseudonym identifier, and the user grade corresponding to the pseudonym identifier is found by a trusted terminal according to a correspondence between a pre-stored pseudonym identifier and the user grade; and
wherein searching for the corresponding user grade according to the user identifier carried in the request for data distribution, and determining the privacy budget parameter corresponding to the user grade performed by the processor comprises: extracting the user grade of a requesting user carried in the request for data distribution, and determining the privacy budget parameter corresponding to the user grade according to a pre-configured correspondence between the user grade and the privacy budget parameter.

8. The server of claim 6, wherein association network data from multiple social network platforms is pre-stored in the server and stored in association with a platform identifier; and wherein searching for raw association network data in response to the request for data distribution performed by the processor comprises: acquiring the association network data stored in association with the platform identifier according to the platform identifier carried in the request for data distribution, so as to extract the raw association network data corresponding to requesting data condition information from the acquired association network data according to the requesting data condition information carried in the request for data distribution.

9. The server of claim 8, wherein the pre-constructed Laplace Model is $$A(D)=M+lap^{\Delta f/\varepsilon}(x)$$

where D is the set of edges to be distributed, A(D) is the distributing probability distribution, $\Delta f/\varepsilon$ is a scale parameter of the probability distribution, c is the privacy budget parameter, and wherein the server pre-stores a correspondence between a value of M and the platform identifier, and the value of M is determined by the server based on the platform identifier corresponding to the raw association network data to be distributed, and used to adjust a whole value range of the distributing probability distribution.

10. The server of claim 6, wherein selecting the arbitrary value within the distributing probability distribution as the distributing probability for each network edge of the set of edges, generating the random number between 0 to 1 for each network edge, comparing the random number to the distributing probability, and distributing the corresponding network edge when the distributing probability is greater than the random number performed by the processor comprises:

selecting the arbitrary value within the distributing probability distribution as the distributing probability for each network edge; and generating the random number for each network edge according to the uniform distribution between 0 to 1, comparing the random number to the distributing probability, and distributing the corresponding network edge when the distributing probability is greater than the random number, otherwise the corresponding network edge being not distributed.

11. One or more non-volatile readable storage media, storing computer-executable instructions operable to be executed by one or more processors to cause the one or more processors to perform following steps:

receiving a request for data distribution sent from a terminal;

searching for raw association network data in response to the request for data distribution, wherein the raw association network data comprises a set of nodes and a set of edges existing between the nodes;

searching for a corresponding user grade according to a user identifier carried in the request for data distribution, and determining a privacy budget parameter corresponding to the user grade, wherein the lower the user grade, the smaller the privacy budget parameter is;

determining a distributing probability distribution corresponding to the raw association network data to be distributed according to a pre-constructed Laplace Model and the determined privacy budget parameter, wherein the lower the privacy budget parameter, the smaller a value range of the distributing probability distribution is; and selecting an arbitrary value within the distributing probability distribution as a distributing probability for each network edge of the set of edges of the raw association network data, generating a random number between 0 to 1 for each network edge, comparing the random number to the distributing probability, and distributing the corresponding network edge when the distributing probability is greater than the random number.

12. The non-volatile readable storage media of claim 11, wherein the user identifier carried in the request for data distribution is a pseudonym identifier resulting from an encryption processing on a true user identifier, the request for data distribution further carries a user grade corresponding to the pseudonym identifier, and the user grade corresponding to the pseudonym identifier is found by a trusted terminal according to a correspondence between a pre-stored pseudonym identifier and the user grade; and wherein searching for a corresponding user grade according to a user identifier carried in the request for data distribution, and determining a privacy budget parameter corresponding to the user grade performed by the processor comprises: extracting the user grade of a requesting user carried in the request for data distribution, and determining the privacy budget parameter corresponding to the user grade according to a pre-configured correspondence between the user grade and the privacy budget parameter.

13. The non-volatile readable storage media of claim 11, wherein association network data from multiple social network platforms is pre-stored in the server and stored in association with a platform identifier; and wherein searching for raw association network data in response to the request for data distribution which is performed by the processor comprises: acquiring the association network data stored in association with the platform identifier according to the platform identifier carried in the request for data distribution, so as to extract the raw association network data corresponding to requesting data condition information from the acquired association network data according to the requesting data condition information carried in the request for data distribution.

14. The non-volatile readable storage media of claim 13, wherein the pre-constructed Laplace Model is $$A(D)=M+lap^{\Delta f/\varepsilon}(x)$$

where D is the set of edges to be distributed, A(D) is the distributing probability distribution, $\Delta f/\varepsilon$ is a scale parameter of the probability distribution, c is the privacy budget parameter, and wherein the server pre-stores a correspondence between a value M and the platform identifier, and the value of M is determined by the server based on the platform identifier corresponding to the raw association network data to be distributed, and used to adjust a whole value range of the distributing probability distribution.

15. The non-volatile readable storage media of claim 11, wherein selecting the arbitrary value within the distributing probability distribution as the distributing probability for each network edge of the set of edges, generating the random number between 0 to 1 for each network edge, comparing the random number to the distributing probability, and distributing the corresponding network edge when the distributing probability is greater than the random number performed by the processor comprises:

selecting the arbitrary value within the distributing probability distribution as the distributing probability for each network edge; and generating the random number for each network edge according to the uniform distribution between 0 to 1, comparing the random number to the distributing probability, and distributing the corresponding network edge when the distributing probability is greater than the random number, otherwise the corresponding network edge being not distributed.

* * * * *